US008971664B2

(12) United States Patent
VanDame

(10) Patent No.: US 8,971,664 B2
(45) Date of Patent: Mar. 3, 2015

(54) METHOD AND DEVICE FOR GENERATING A SUPER-RESOLUTION IMAGE PORTION

(71) Applicant: Canon Kabushiki Kaisha, Tokyo (JP)

(72) Inventor: Benoît VanDame, Betton (FR)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/672,589

(22) Filed: Nov. 8, 2012

(65) Prior Publication Data

US 2013/0114892 A1 May 9, 2013

(30) Foreign Application Priority Data

Nov. 9, 2011 (GB) .................................. 1119316.6
Oct. 25, 2012 (GB) .................................. 1219215.9

(51) Int. Cl.
*G06K 9/36* (2006.01)
*G06T 3/00* (2006.01)
*G06T 3/40* (2006.01)

(52) U.S. Cl.
CPC ............. *G06T 3/0093* (2013.01); *G06T 3/4053* (2013.01)
USPC ...................................................... 382/284

(58) Field of Classification Search
USPC ...................................................... 382/284
See application file for complete search history.

(56) References Cited

U.S. PATENT DOCUMENTS 6,208,765 B1    3/2001  Bergen
6,434,280 B1 *  8/2002  Peleg et al. ................... 382/299
6,456,339 B1 *  9/2002  Surati et al. ................... 348/745
7,085,409 B2 *  8/2006  Sawhney et al. .............. 382/154
7,298,922 B1 * 11/2007  Lindgren et al. ............. 382/294
8,537,278 B1 *  9/2013  Bozinovic ..................... 348/452
8,567,953 B2 * 10/2013  O'Dor et al. ..................... 353/7

(Continued)

FOREIGN PATENT DOCUMENTS

JP       2011082614 A        4/2011

OTHER PUBLICATIONS

G. Cristóbal et al.,Super-resolution imaging: a survey of current techniques, Advanced Signal Processing Algorithms, Architectures, and Implementations XVIII, Proceedings of the SPIE, vol. 7074, pp. 70740C-1-70740C-18, Society of Photo-optical Instrumentation Engineers, Bellingham, WA, Aug. 28, 2008.

(Continued)

*Primary Examiner* — Jingge Wu
(74) *Attorney, Agent, or Firm* — Canon USA Inc IP Division

(57) ABSTRACT

A method for generating a super-resolution image from at least two input images, represented by digital samples. The super-resolution image having a final resolution higher than an initial resolution of one of at least two input images. The method including obtaining, for each input image of the at least two input images, a distortion model to register the input image on a reference grid at the final resolution. The method including warping each input image into a warped image according to the distortion model. Computing warped coordinates respectively for digital samples of the input image. Wherein, the contribution of each digital sample of the input image to the warped image is weighted. The weight applied to each digital sample depending on the warped coordinates of the digital sample. Combining the warped images in order to generate a combined warped image having the final resolution.

21 Claims, 3 Drawing Sheets

(56) References Cited

U.S. PATENT DOCUMENTS

| | | | |
|---|---|---|---|
| 2001/0038718 A1* | 11/2001 | Kumar et al. | 382/284 |
| 2003/0190072 A1* | 10/2003 | Adkins et al. | 382/154 |
| 2004/0151401 A1* | 8/2004 | Sawhney et al. | 382/299 |
| 2008/0309884 A1* | 12/2008 | O'Dor et al. | 353/7 |
| 2009/0110332 A1* | 4/2009 | Lin et al. | 382/300 |
| 2011/0181701 A1* | 7/2011 | Varslot et al. | 348/46 |
| 2012/0235679 A1* | 9/2012 | Xue et al. | 324/307 |
| 2012/0269458 A1* | 10/2012 | Graziosi et al. | 382/299 |

OTHER PUBLICATIONS

Chris Harris et al., A Combined Corner and Edge Detector, Proceedings of the Fourth Alvey Vision Conference 1988, pp. 147-152, The British Machine Vision Association and Society for Pattern Recognition, Manchester, UK, Aug. 31, 1988.

* cited by examiner

METHOD AND DEVICE FOR GENERATING A SUPER-RESOLUTION IMAGE PORTION

FIELD OF THE INVENTION

The present invention concerns a method and a device for generating a super-resolution image using a set of images.

In particular, the pixel resolution/pixel density of a super-resolution image generated from the set of images is higher than the pixel resolution/pixel density of those images.

BACKGROUND OF THE INVENTION

On generating a super-resolution image using a set of images, each image belonging to the set of images is warped in order to align and zoom out to fit it to a grid corresponding to the super-resolution image.

Alignment and zooming are carried out according to a distortion model and consist in associating each pixel location of each image of the set of images with a location within the grid corresponding to the super-resolution image.

Since the pixel resolution/pixel density of the super-resolution image is higher than the pixel resolution/pixel density of the images of the set of images, interpolation is used in order to obtain the super-resolution image.

The interpolation has a visible impact on a warped image. In particular, when warping the image in order to obtain the super-resolution image, high frequencies are reduced, which means that high frequencies are low pass filtered.

Thus, the warped image is smoothed and/or a ringing effect is produced in the warped image.

A solution is proposed in the article "*Super-resolution imaging: a survey of current techniques*" G. Cristobal, E. Gila, F. Sroubek, J. Flusser, C. Miravet, F. B. Rodriguez. Advanced Signal Processing Algorithms, Architectures, and Implementations XVIII; edited by Luk, Franklin T. Proceedings of the SPIE, Volume 7074, pp. 70740C-1 70740C 18 (2008).

This article deals with the problem as re-sampling with irregular pixels. The weight of each pixel depends on a neural network which is being trained by several images.

However, the proposed solution uses a neural network to compute special weight for image warping, which generates a high computational cost.

The present invention is directed to mitigating the aforesaid limitations and to providing a method for generating a super-resolution image using a set of images, and a device associated with that method, making it possible to obtain a super-resolution image of higher quality.

SUMMARY OF THE INVENTION

To that end, according to a first aspect, the present invention concerns a method for generating a super-resolution image from at least two input images represented by digital samples, said super-resolution image having a final resolution higher than an initial resolution of one of said at least two input images.

According to the invention, the method comprises the following steps:
  obtaining, for each input image of said at least two input images, a distortion model to register said input image on a reference grid at said final resolution;
  warping each input image into a warped image according to said distortion model obtained, comprising computing warped coordinates respectively for digital samples of said input image, wherein the contribution of each digital sample of said input image to said warped image is weighted, the weight applied to each digital sample depending on the warped coordinates of said digital sample; and
  combining said warped images in order to generate a combined warped image having said final resolution.

Thus, the contribution of each digital sample of each image is determined by taking into account the warped coordinates.

Therefore, the visible impact of the interpolation on the warped image is reduced and the super-resolution image can be generated while providing protection for the high frequencies.

For example, the at least two input images are generated by using a colour filter array, a colour component being associated with each digital sample of said at least two input images, and wherein warping step further comprises computing warped colour components respectively for colour components associated with digital samples.

Thus, the generated super-resolution image can be a colour image.

According to a feature, on computing warped colour components, the contribution of each colour component to said warped image is weighted, the weight applied to each digital sample depending on the colour component associated to said digital sample.

According to another feature, the step of warping comprises a step of computing a 2D interpolation kernel and a step of applying said weight to the 2D interpolation kernel.

In practice, the step of warping comprises a distortion step using said distortion model applied to digital samples of said input image, said 2D interpolation kernel depending on an interpolation function and on the fractional part of said digital samples after said distortion step.

According to a feature, the weight decreases when the distance between a warped coordinate and the closest integer value to said warped coordinate increases.

Thus, the weight is maximized for the digital samples which are associated in the reference grid to non-integer coordinates with a fractional part close to 0 or 1 and the weight is minimized for the digital samples which are associated in the reference grid to non-integer coordinates with a fractional part close to 5.

According to another feature, the weighted contribution of each digital sample of said input image further depends on a zoom factor between said initial resolution of said input image and said final resolution.

In practice, for a given distance between a warped coordinate and the closest integer value to said warped coordinate, the weight decreases when the zoom factor increases.

According to a feature, the warping step comprises a step of inserting said weights for each digital sample of said input image into a corresponding weight map.

Thus, for each input image, one obtains a warped image and a corresponding weight-map which quantifies the weight applied during the warping step.

In practice, the method comprises a step of combining said weight maps computed respectively for each input image into a combined weight map, said combined weight map being used during the step of combining warped images to generate said combined warped image.

Thus, the warped images can be added together and then divided by the combined weight map in order to obtain a combined warped image. This image is thus almost not affected by the frequency cut caused by the interpolation thanks to the weighting applied during the warping step.

According to another feature, the method further comprises a step of de-blurring said combined warped image to obtain a super-resolution image.

According to a second aspect, the present invention concerns a device for generating a super-resolution image from at least two input images represented by digital samples, said super-resolution image having a final resolution higher than an initial resolution of one of said at least two input images, comprising:

obtaining, for each input image of said at least two input images, a distortion model to register said input image on a reference grid at said final resolution;

warping each input image into a warped image according to said distortion model obtained, comprising a microprocessor for computing warped coordinates respectively for digital samples of said input image, wherein the contribution of each digital sample of said input image to said warped image is weighted, the weight applied to each digital sample depending on the warped coordinates of said digital sample; and combining said warped images in order to generate a combined warped image having said final resolution.

According to a feature, the at least two input images are generated by using a colour filter array, a colour component being associated with each digital sample of said at least two input images, and warping further comprises computing warped colour components respectively for colour components associated with digital samples.

According to another feature, computing warped colour components are adapted such as the contribution of each colour component to said warped image is weighted, the weight applied to each digital sample depending on the colour component associated to said digital sample.

According to a third aspect, the present invention also concerns a processing device such as a micro-computer, a workstation or a light portable device, comprising a device for generating a super-resolution image The device for generating a super-resolution image and the processing device have features and advantages that are similar to those described above in relation to the generating method.

BRIEF DESCRIPTION OF THE DRAWINGS

Still other particularities and advantages of the invention will appear in the following description, made with reference to the accompanying drawings which are given by way of non-limiting example, and in which.

DETAILED DESCRIPTION OF PARTICULAR EMBODIMENTS

Figure 1:
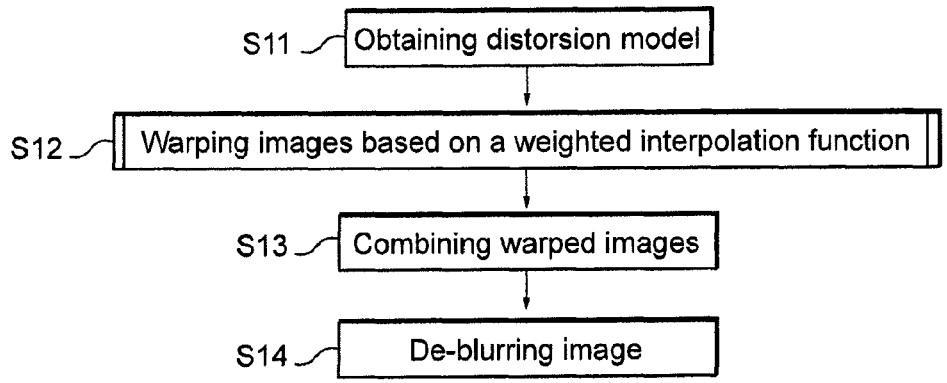
FIG. 1 is a flow chart representing an embodiment of a method for generating a super-resolution image in accordance with the invention.

With reference to FIG. 1, a description will be given of the method for generating a super-resolution image according to the invention.

The method comprises a step of obtaining S11 a distortion model for each image of a set of input images. The set of input images comprises at least two input images represented by digital samples. In the following, each digital sample is called a pixel and is associated with initial coordinates in the input image.

For each image of the set of input images, the distortion model associates a coordinate of a pixel within the initial grid of the image of the set of images with a coordinate within a reference grid of the super-resolution image.

The super-resolution image has a final resolution higher than the initial resolution of the images of the set of input images. For example, the zoom factor between the initial resolution and the super-resolution is equal to 2 or 3 (that is the image is zoomed by a factor of 2 or 3 in X and Y directions).

The reference grid is obtained by applying the zoom factor to the initial grid of the image of the set of input images.

For this operation, a reference image is defined in the set of input images and the zoom factor is applied to the initial grid of the reference image of the set of input images in order to obtain the grid of reference.

A distortion model is said to be forward if a pixel of an image of the set of input images, having integer coordinates in the initial grid, is associated with a pixel of the super-resolution image, having non-integer coordinates in the reference grid.

A distortion model is said to be backward if a pixel of the super-resolution image, having integer coordinates in the reference grid is associated with a pixel of an image of the set of input images, having non-integer coordinates in the initial grid.

Different methods may be used in order to obtain the distortion model for an image.

In one embodiment, for each image $I_i$ of the set of input images, the obtaining step S11 comprises a step of selecting a set of points of interest of the image $I_i$. This selection may be implemented by using different methods, for example the Harris corner and edge detection algorithm as disclosed in C. Harris and M. J. Stephens, "*A combined corner and edge detector*", in Alvey Vision Conference, pages 147-152, 1988.

The set of points of interest comprises the points in the image which have a well defined position, for example a corner (intersection of two edges), a point located on a curve, or a line ending.

It should be noted that in this example, each point of interest is defined by a two dimensional coordinate in the initial grid.

As a result of this selecting step, a set of points of interest is associated with each image of the set of images.

The obtaining step also comprises a step of associating each point of interest of the set of points of interest associated with the image $I_i$ with each point of interest of the set of points of interest associated with the reference image $I_r$.

For example, when the associating step is applied to the image $I_i$, the association of points of interest of the reference image $I_r$ with points of interest of a previous image belonging to the set of images, can be used.

Thus, an association between a point of interest of the image $I_i$ and a point of interest of the reference image $I_r$ corresponds to a pair of associated coordinates.

Next, each pair of associated coordinates is modified such that the coordinates within the reference image are zoomed by a super-resolution zoom factor s.

The obtaining step finally comprises a step of computing a distortion model from the associated coordinates.

In one embodiment, this computing step comprises characterizing the distortion model by a first order polynomial function which handles the rotation, the scaling and the translation of coordinates in the super-resolution grid with respect to the image grid. The distortion model is defined by a set of parameters, and for instance 6 parameters in case of first order distortion polynomial functions.

The parameters are computed by using least square method applied on the several associations computed previously for each point of interest.

The first order polynomial functions are solved either in a forward context, that is the zoomed coordinates of the reference image $I_r$ are function of the initial coordinates of the input image $I_i$, or in a backward context, that is the coordinates of the input image $I_i$ are function of the zoomed coordinates of the reference image $I_r$.

As an example, a polynomial function of order O in a forward context is given as follows:

$$\begin{cases} X = \sum_{i=0}^{2} \sum_{j=0}^{2-i} a_{ij} x^i y^j = a_{20} x^2 + a_{11} xy + a_{02} y^2 + a_{10} x + a_{01} y + a_{00} \\ Y = \sum_{i=0}^{2} \sum_{j=0}^{2-i} b_{ij} x^i y^j = b_{20} x^2 + b_{11} xy + b_{02} y^2 + b_{10} x + b_{01} y + b_{00} \end{cases}$$

wherein (X, Y) are the non-integer coordinates obtained by the distortion model in the super-resolution grid and (x,y) are the integer coordinates of the pixels of the input images. If the order O is equal to 1, the distortion model is a linear distortion which handles rotation, translation and scale.

Thus at the end of the obtaining step S11, each input image Ii is associated with a distortion-model which links the coordinates of the input image Ii with the super-resolution grid.

Once the distortion model has been obtained, a step of warping S12 the image $I_i$ is implemented.

This step of warping S12 defines how the input images Ii are warped according to their distortion-model.

A common choice for image warping is to use a sinc function which is spatially truncated by a given window function. For example, a common window function used for image warping is a Lanczos function:

$$L_n(l) = \frac{\sin \pi l / n}{\pi l / n} \text{ for } |l| < n$$

In case of a Lanczos window function of order n, the total extension of the interpolation function is equal to 2n.

In practice a Lanczos window function of order 2 is a common choice because it is a good compromise between computational cost and the sinc ideal filter.

The interpolation function I(l) in case of Lanczos warping is defined by:

$$I(l) = L_n(l) \cdot \pi \text{sinc}(l) = \frac{\sin \pi l / n}{\pi l / n} \cdot \frac{\sin \pi l}{l}$$

As mentioned above, the distortion model associates an integer coordinate (x,y) with a non-integer transformed coordinate (X,Y). The transformed coordinate is decomposed into integer part and fractional part:

$(X,Y)=(\lfloor X \rfloor+\{X\}, \lfloor Y \rfloor+\{Y\})$ where: $\lfloor \bullet \rfloor$ is the floor function (the integer part); and $\{\bullet\}$ is the fractional function (the non integer part such as $0 \leq \{\bullet\} < 1$).

The integer part of the coordinate corresponds to basic integer translation, whereas the non-integer part is performed by interpolation based on the interpolation function.

The 1D Lanczos order 2 interpolation function $I(l-\{X\})$ is sampled at $l=-1\ 0\ 1\ 2$. The 4 values define the 1D interpolation kernel and are organized into a 1D vector $I_{\{X\}}$. Equivalently, one gets 1D interpolation kernel $I_{\{Y\}}$ for the interpolation in the Y direction. The complete 2D interpolation kernel for the fractional shift $\{X,Y\}$ is given by $I_{\{X,Y\}} = I_{\{X\}} \cdot I_{\{Y\}}^T$.

In order to mitigate the problems created by the interpolation, before implementing the step of warping the image $I_i$, a step of associating a weight with the interpolation kernel is implemented.

The weight is a function of the fractional part $\epsilon$ of a non-integer coordinate and the super-resolution zoom factor s. The fractional part $\epsilon$ presents a value comprised between 0 and 1 ($\epsilon \in [0,1]$) and corresponds to $\{X\}$ or $\{Y\}$ in the following description.

In the embodiment described, the weighting is implemented by using the weighting function in 1D as follows:

$$W(\varepsilon, s) = \max\left(\frac{1}{1+e^{k(\varepsilon-1/2s)}} + \frac{1}{1+e^{-k(\varepsilon-1+1/2s)}}, W_{min}\right)$$

where
- k is a parameter controlling the slope around two inflexion points corresponding respectively to the centre of symmetry of each sigmoid curve defined by each sigmoid function in the previous equation, and
- $W_{min}$ is a parameter controlling the minimum weight. This parameter prevents $W(\epsilon,s)$ from converging to zero. For example, the value of $W_{min}$ is 0.1.

It should be noted that if the weight associated with a pixel of an image were to be equal to zero, some pixels of the super-resolution image might not receive any contribution from pixels of the image if no warped pixel of the image is close enough.

The weight decreases when the distance between a warped coordinate X, Y and its closest integer value increases.

Moreover, for a given distance between a warped coordinate and its closest integer value, the weight decreases when the zoom factor increases.

Figure 2:
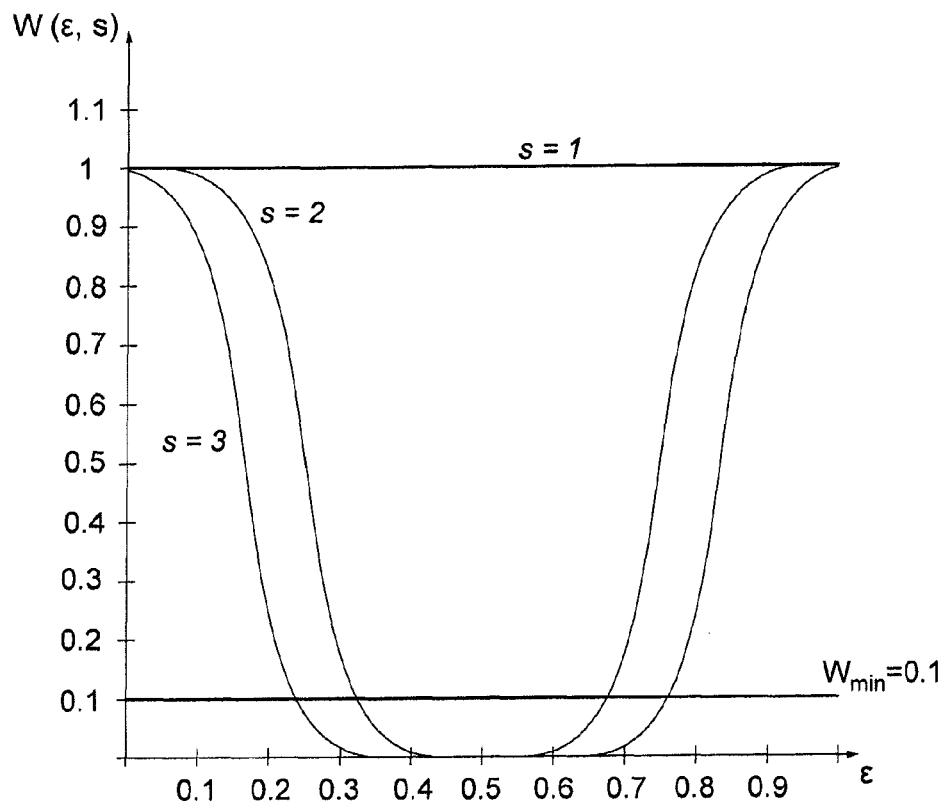
FIG. 2 illustrates a weighting function for several super-resolution zoom factors.

FIG. 2 illustrates weighting functions for several resolution zoom factors s (1, 2, and 3). Parameter k is equal to 30 and parameter $W_{min}$ is equal to 0.1.

Different weighting functions can be used, yielding high values when the fractional part $\epsilon$ presents a value close to 0 or 1, and low values when the fractional $\epsilon$ part presents a value close to 0.5.

Figure 3:
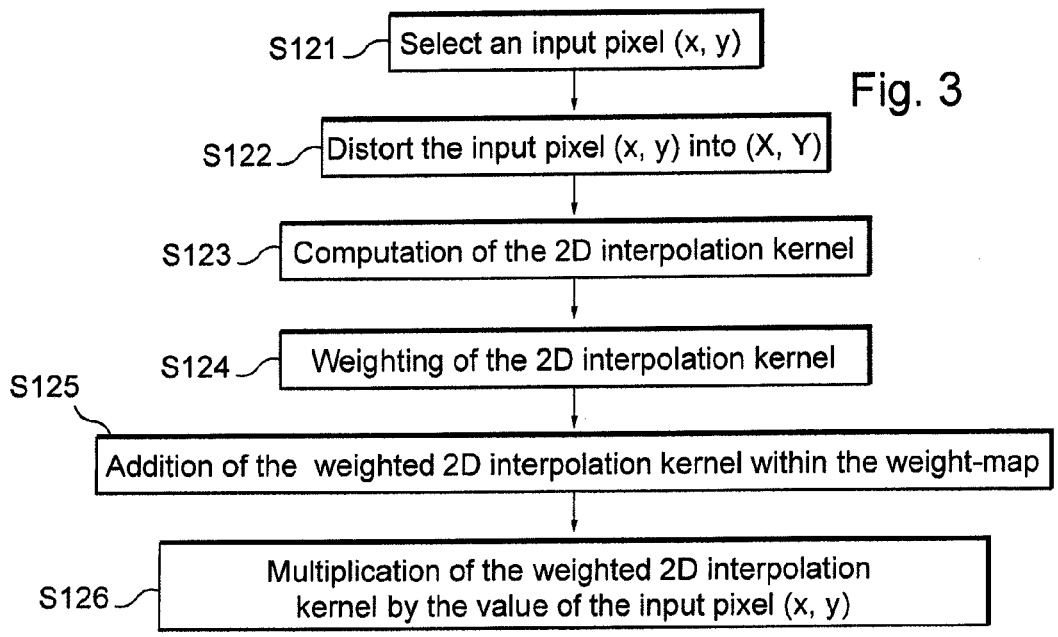
FIG. 3 is a flow chart representing the step of warping in FIG. 1 in a forward warping case.
Figure 4:
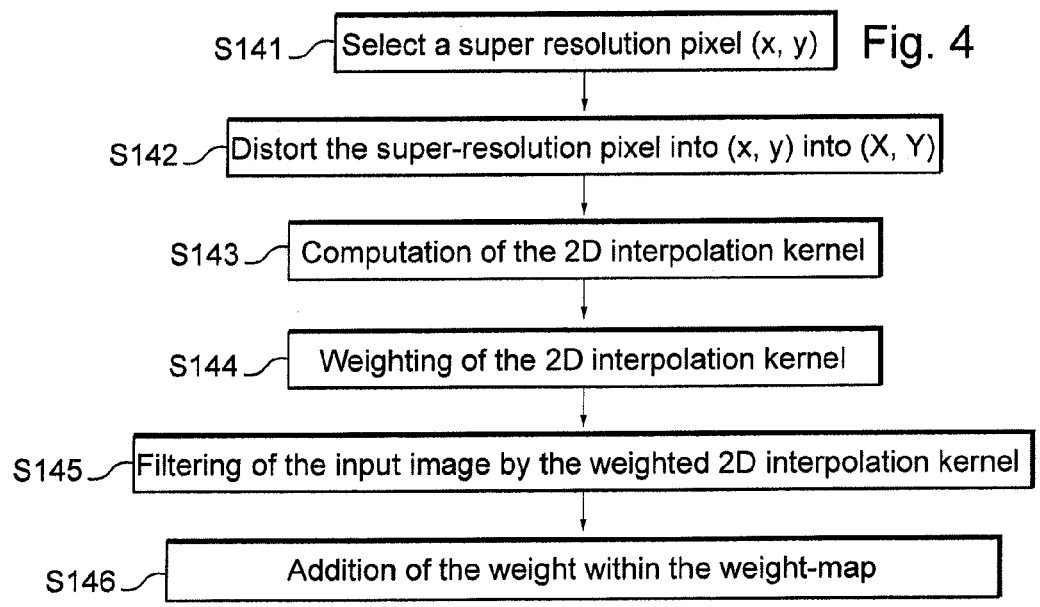
FIG. 4 is a flow chart representing the step of warping in FIG. 1 in a backward warping case.

With reference to FIGS. 3 and 4, a description will be given of the step of warping S12 an image of a set of images.

This warping step is different depending on whether the warping uses a distortion model of forward or of backward type.

It should be noted that the warping step S12 is implemented for each image of the set of image. Thus, the warping step will be described here only for one image.

In case of forward type, the warping step starts with a step of selecting S121 a pixel from the image. The pixel is represented by its coordinates (x,y), which are integers coordinates.

Next, a distortion step S122 is applied to the pixel (x,y). This distortion step S122 consists in distorting the pixel in order to translate it into the super-resolution grid. The distortion is applied using the distortion model obtained at the obtaining step S11. The distorted pixel is represented by the coordinates (X, Y). These coordinates (X, Y) are non-integer.

Once all the pixels of the image have been distorted, a step of computation S123 of the interpolation kernel is implemented. This interpolation kernel is a two dimensional kernel (2D interpolation kernel) as above explained.

The 2D interpolation kernel depends on the fractional part {X}, {Y} of the distorted coordinates (X, Y), the super-resolution zoom factor s and an interpolation function.

In the embodiment described, the interpolation function I(I) can be a common interpolation function Lanczos as above explained.

Next, at a weighting step S124, the 2D interpolation kernel is weighted. This weighting is applied depending on the fractional part {X}, {Y} of the distorted pixel (X, Y) and according to a weighting function.

In the embodiment described for the first dimension X, the interpolation kernel is obtained by using the weighted interpolation function:

$$I_{ForwWeight}(l, \{X\}, s) = I\left(\frac{l-\{X\}}{s}\right) \cdot W\left(\left\{\frac{l-\{X\}}{s}\right\}, s\right)$$

where I is an integer and its absolute value is less than the super-resolution zoom factor (|l|<sn).

The same interpolation kernel is used for the second dimension Y.

Then, the calculation of the 2D interpolation kernel is computed as above explained according to the following equation:

$$I_{\{X,Y\}} = I_{\{X\}} \cdot I_{\{Y\}}^T$$

Thus, for each image of the set of input images, a weighted interpolation kernel results from the steps of computation S123 of the interpolation kernel and of weighting S124.

Therefore, a weight-map is obtained that is associated with a warped image. The weight-map has a size equal to the size of the super-resolution image and quantifies, for each pixel, the weight received during the weighted image warping.

Thus, a step of adding S125 the weighted interpolation kernel to the weight-map at a location given by the integer part of the distorted coordinate (X, Y) is implemented.

Next, at a multiplication step S126, the weighted interpolation kernel is multiplied by the value of the pixel (x, y) of the input image. Finally, the result of this multiplication is added to the super-resolution image at a location given by the integer part of the distorted coordinate (X, Y).

The warping step S12 will be now described for the backward type with reference to FIG. 4.

The warping step S12 starts implementing a step of selecting S141 a pixel from the super-resolution image. The pixel is represented by its coordinates (x,y), which are integers coordinates.

A distortion step S142 is then applied to the pixel (x,y) consisting in distorting the selected pixel in order to translate it into the grid of an image of the set of input images. The distortion is applied using the distortion model obtained at the obtaining step S11. The distorted pixel is represented by the coordinates (X, Y). These coordinates (X, Y) are non-integer.

Once all the pixels of the image have been distorted, a step of computation S143 of the interpolation kernel is implemented. This interpolation kernel is a two dimensional kernel (2D interpolation kernel).

As previously explained, the interpolation kernel depends on the fractional part {X}, {Y} of the distorted coordinates (X, Y) and an interpolation function.

Thus, the interpolation kernel is weighted in a weighting step S144, using the weighted interpolation function:

$$I_{BackWeight}(l, \{X\}, s) = I(l-\{X\}) \cdot W(\{l-\{X\}\}, s)$$

where l is an integer and its absolute value is less than the super-resolution zoom factor (|l|<s)

The weighting function W is the same as the one described previously with reference to FIG. 2.

The weighted interpolation function can be simplified since W{l-{X}} is equal to {X}:

$$I_{BackWeight}(l, \{X\}, s) = I(l-\{X\}) \cdot W(\{X\}, s)$$

Then, a filtering step S145 is implemented.

During this filtering step S145, the weighted interpolation kernel is applied to the input image in order to obtain a value which will be added to super-resolution image.

Finally, an addition step S146 is implemented in order to add the weight of W({X}, s). W({Y}, s) at the location of the super-resolution pixel (X, Y).

Due to this weighted interpolation kernel, some input pixels have very small contribution to the super-resolution image.

Their contribution is very small because their warped coordinate have fractional part close to ½.

In average the noise level of the super-resolution computed with the weighted warping as above described is $s^2$ higher than the noise level of the super-resolution computer with standard image warping.

At the end of the warping step S12, one obtains a warped image and a corresponding weight map which quantifies the weight received during the forward or backward weighted image warping.

The warping step S12 is implemented for all input images of the set of input images.

Then, with reference again to FIG. 1, a combining step S13 is implemented.

At this combining step S13, the warped images are added together into a single image, named master warped image. This addition is possible because all the warped images have the same grid.

The weight-maps associated respectively with the warped images are also added together in order to form a master weight-map.

Next, the master warped image is divided by the master weight-map.

Thanks to the weighting of the interpolation kernel, the high frequencies have been protected in the image resulting from this division.

Finally, at step of de-blurring S14, the image obtained by dividing the master warped image by the master weight-map, is de-blurred, which leads to better recover high frequencies.

In an embodiment, the de-blurring is implemented by applying a common method called the Van-Cittert method to that image.

The Van-Citter method is well known to a person skilled in the art and it will not be described here.

A true model for the blur function can be obtained knowing the sensors and the lenses used to acquire the images.

In one embodiment, input images of the set of input images are colour image.

Most of colour images are taken from sensors mounted with a Colour Filter Array (CFA). In the raw image that has been obtained by sensors, a colour component is associated with each pixel.

For example, a Color Filter Array is a Bayer filter. Bayer filter comprises a 2 by 2 pixels matrix a first pixel corresponding to red component, a second pixel corresponding to blue component, and a third and a fourth pixels corresponding to green component.

In case of colour Filter Array images, the warping step uses a distortion model of forward type (backward type cannot be applied for Colour Filter Array images).

In this embodiment, the weighted interpolation function for obtaining the interpolation kernel becomes:

$$I_{ForwWeight}(l, \{X\}, s) = I\left(\frac{l-\{X\}}{ms}\right) \cdot W\left(\left\{\frac{l-\{X\}}{ms}\right\}, ms\right)$$

Where m is the size of the Colour Filter Array (for instance m is 2 for Bayer Filter).

Each colour component of each raw input image is warped into the super-resolution grid. It should be noted that in the super-resolution grid a colour component corresponds to each pixel and the number of different colour components is the same than the number of different colour components of the Colour Filter Array.

Thus, the weight map obtained at the end of the warping step comprises the contribution of the raw pixels taking into account the colour component respectively associated to the pixels.

Figure 5:
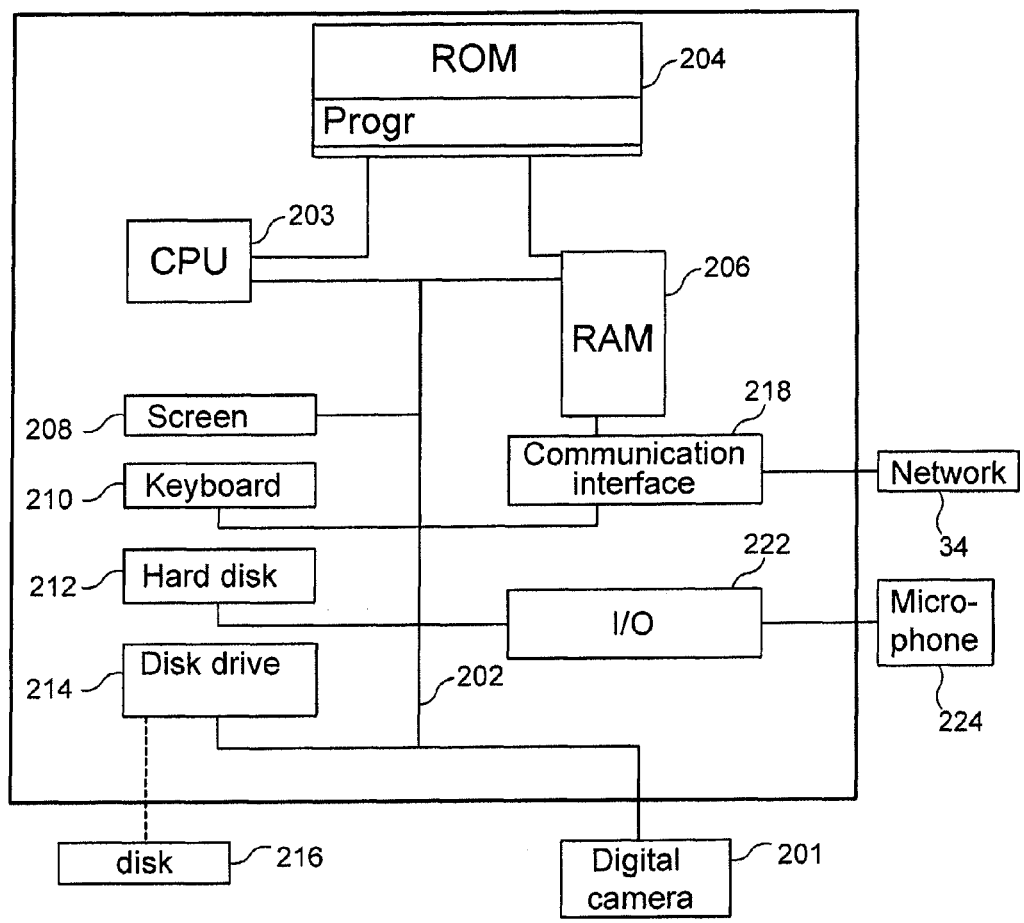
FIG. 5 represents a particular hardware configuration of a device suitable for implementation of the method according to the invention.

FIG. 5 schematically illustrates a processing device 200 configured to implement at least one embodiment of the present invention. The processing device 200 may be a device such as a micro-computer, a workstation or a light portable device. The device 200 comprises a communication bus 202 to which there are preferably connected:
- a central processing unit 203, such as a microprocessor, denoted CPU;
- a read only memory 204, denoted ROM, for storing computer programs for implementing the invention;
- a random access memory 206, denoted RAM, for storing the executable code of the method of embodiments of the invention as well as the registers adapted to record variables and parameters necessary for implementing the method of generating a super-resolution image according to embodiments of the invention; and
- a communication interface 218 connected to a communication network 203 over which digital data to be processed are transmitted.

Optionally, the apparatus 200 may also include the following components:
- a data storage means 212 such as a hard disk, for storing computer programs for implementing methods of one or more embodiments of the invention and data used or produced during the implementation of one or more embodiments of the invention;
- a disk drive 214 for a disk 216, the disk drive being adapted to read data from the disk 216 or to write data onto said disk;
- a screen 208 for displaying data and/or serving as a graphical interface with the user, by means of a keyboard 210 or any other pointing means.

The apparatus 200 can be connected to various peripherals, such as for example a digital camera 201 or a microphone 224, each being connected to an input/output card (not shown) so as to supply multimedia data to the apparatus 200.

The communication bus provides communication and interoperability between the various elements included in the apparatus 200 or connected to it. The representation of the bus is not limiting and in particular the central processing unit is operable to communicate instructions to any element of the apparatus 200 directly or by means of another element of the apparatus 200.

The disk 216 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of generating a super-resolution image according to the invention to be implemented.

The executable code may be stored either in the read only memory 204, on the hard disk 212 or on a removable digital medium such as for example a disk 216 as described previously. According to a variant, the executable code of the programs can be received by means of the communication network 34, via the interface 218, in order to be stored in one of the storage means of the apparatus 200 before being executed, such as the hard disk 212. An exemplary embodiment of the present invention is set of instructions encoded on a non-transitory computer readable medium.

The central processing unit 211 is adapted to control and direct the execution of the instructions or portions of software code of the program or programs according to the invention, instructions that are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Of course, the present invention has been described for a whole image.

However, the method according to the invention may also be applied for generating a super-resolution image portion.

This application claims priority from Great Britain Patent Application No. 1119316.6 filed on Nov. 9, 2011, which is hereby incorporated by reference herein in its entirety. This application also claims priority from Great Britain Patent Application No. 1219215.9, filed on Oct. 25, 2012 which is hereby incorporated by reference herein in its entirety.

I claim:

1. A method for generating a super-resolution image from at least two input images represented by digital samples, the super-resolution image having a final resolution higher than an initial resolution of one of the at least two input images, the method comprising the following steps:
   obtaining, for each input image of the at least two input images, a distortion model to register the input image on a reference grid at the final resolution;
   warping each input image into a warped image according to the distortion model, comprising computing warped coordinates respectively for digital samples of the input image, wherein the contribution of each digital sample of the input image to the warped image is weighted, the weight applied to each digital sample depending on the warped coordinates of the digital sample; and
   combining the warped images in order to generate a combined warped image having the final resolution.

2. The method according to claim 1, wherein the at least two input images are generated by using a colour filter array, a colour component being associated with each digital sample of the at least two input images, and wherein the warping step further comprises computing warped colour components respectively for colour components associated with digital samples.

3. The method according to claim 2, wherein on computing warped colour components, the contribution of each colour component to the warped image is weighted, the weight applied to each digital sample depending on the colour component associated with each digital sample.

4. The method according to claim 1, wherein the step of warping comprises a step of computing a 2D interpolation kernel and a step of applying the weight to the 2D interpolation kernel.

5. The method according to claim 4, wherein the warping step comprises a distortion step using the distortion model applied to digital samples of the input image, the 2D interpolation kernel depends on an interpolation function and on a fractional part of the digital samples after the distortion step.

6. The method according to claim 1, wherein the weight decreases when a distance between a warped coordinate and a closest integer value to the warped coordinate increases.

7. The method according to claim 1, wherein the weighted contribution of each digital sample of the input image further depends on a zoom factor between the initial resolution of the input image and the final resolution.

8. The method according to claim 7, wherein, for a given distance between a warped coordinate and a closest integer value to a warped coordinate, the weight decreases when the factor increases.

9. The method according to claim 1, wherein the warping step further comprises a step of inserting the weights for each digital sample of the input image into a corresponding weight map.

10. The method according to claim 9, further comprising a step of combining the weight maps computed respectively for each input image into a combined weight map.

11. The method according to claim 10, wherein the step of combining the warped images uses the combined weight map to generate the combined warped image.

12. The method according to claim 1, further comprising a step of deblurring the combined warped image to obtain a super-resolution image.

13. A device for generating a super-resolution image from at least two input images represented by digital samples, the super-resolution image having a final resolution higher than an initial resolution of one of the at least two input images, comprising:

an obtainer that obtains, for each input image of the at least two input images, a distortion model to register the input image on a reference grid at the final resolution;

a warper that warps each input image into a warped image according to the distortion model obtained, comprising a microprocessor for computing warped coordinates respectively for digital samples of the input image, wherein the contribution of each digital sample of the input image to the warped image is weighted, the weight applied to each digital sample depending on the warped coordinates of the digital sample; and a combiner that combines the warped images in order to generate a combined warped image having the final resolution.

14. The device according to claim 13, wherein the at least two input images are generated by using a colour filter array, a colour component being associated with each digital sample of the at least two input images, and wherein the warper further comprises the microprocessor that computes warped colour components respectively for colour components associated with digital samples.

15. The device according to claim 14, wherein the microprocessor computes warped colour components adapted such that the contribution of each colour component to the warped image is weighted, the weight applied to each digital sample depending on the colour component associated with the digital sample.

16. The device according to claim 13, wherein the warper further comprises the microprocessor for computing a 2D interpolation kernel and applies the weight to the 2D interpolation kernel.

17. The device according to claim 16, wherein the warper further comprises a distorter that distorts using the distortion model applied to digital samples of the input image, the 2D interpolation kernel depends on an interpolation function and on a fractional part of the digital samples after the distortion.

18. The device according to claim 13, wherein the weight decreases when a distance between a warped coordinate and a closest integer value to the warped coordinate increases.

19. The device according to claim 13, wherein the weighted contribution of each digital sample of the input image further depends on a zoom factor between the initial resolution of the input image and the final resolution.

20. The device according to claim 13, further comprising de-blurring the combined warped image to obtain a super-resolution image.

21. The device according to claim 13 is a processing device such as: a micro-computer, a workstation or a light portable device.

* * * * *